C. P. KELSEY.
MANUFACTURE OF GRAIN CRADLE-FINGERS.

No. 171,025. Patented Dec. 14, 1875.

Witnesses:
M. Gardner
Chas. A. Clements

Inventor:
C. P. Kelsey
per N. DuBois
Attorney

UNITED STATES PATENT OFFICE.

CHRISTOPHER P. KELSEY, OF RICHMONDVILLE, NEW YORK.

IMPROVEMENT IN THE MANUFACTURE OF GRAIN-CRADLE FINGERS.

Specification forming part of Letters Patent No. 171,025, dated December 14, 1875; application filed June 17, 1875.

*To all whom it may concern:*

Be it known that I, CHRISTOPHER P. KELSEY, of Richmondville, in the county of Schoharie and State of New York, have invented an Improvement in the Manufacture of Grain-Cradle Fingers, of which the following is a specification:

The object of my invention is to form a whole set of cradle-fingers at one operation, and from a single piece of timber, so that each finger shall be of the same kind of timber; and, also, to keep them together, so that they may all be bent on a crimping-iron at the same time.

It consists in providing a grooving-knife so formed as to groove out a tapering piece of timber on each side, and form the whole set of fingers at once, leaving them attached at each end, so that they may be uniformly bent on a crimping-iron or mold of peculiar shape, as hereinafter described.

Figure 1:
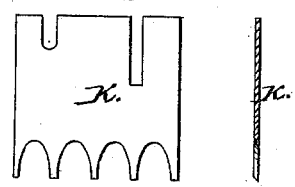
Figure 2:
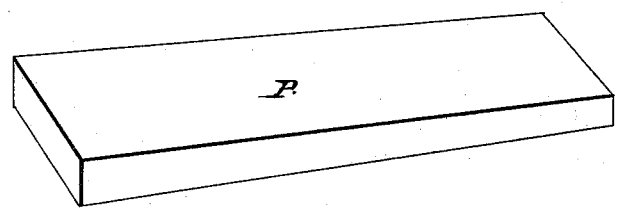
Figure 3:
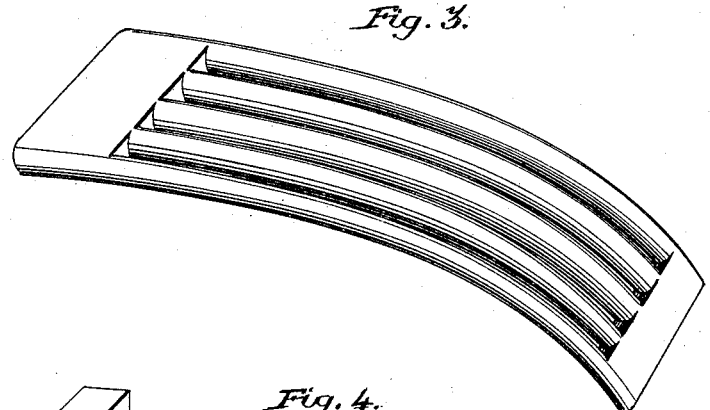
Figure 4:
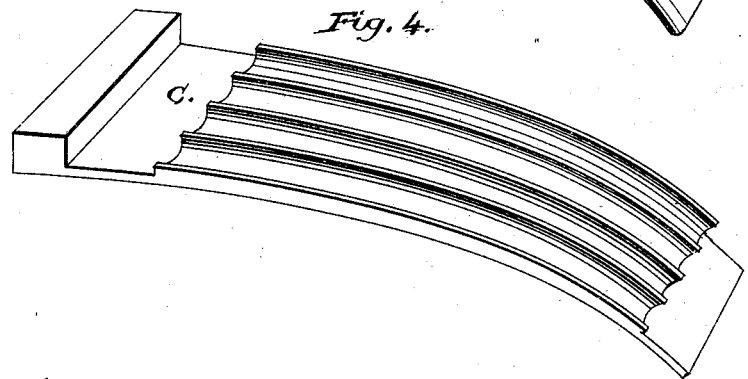

In the accompanying drawings, Figure 1 represents the grooving or finishing knife; Fig. 2, the tapering piece of wood; Fig. 3, the same after being grooved and bent, and Fig. 4 the crimping-iron or mold.

The knife K, with serrated edge, as shown in Fig. 1, being fastened in a rotary cutter-head, the tapering piece of wood P is passed over the knife K, finishing the fingers on one side, and then on the other, till the fingers are properly formed and finished, leaving them attached at the ends, as shown in Figs. 2 and 3. The whole is then bent over the crimping-iron C. (Shown in Fig. 4.) This crimping-iron is cast with longitudinal flanges, which come up between the fingers while being bent, and hold them securely in place; and, being heated quickly and thoroughly, dries the concave side of the fingers, while the outside convex side is left without drying, thus securing the fingers from straightening if laid under water.

This method of using the knife K may be applied to cutting out spokes for carriage-wheels, and to other rods or rolls, large or small.

What I claim as my invention is—

1. The iron crimp or mold C, cast with longitudinal flanges, substantially as shown, and for the purpose specified.

2. The grain-cradle finger, formed of a straight piece of timber, attached at the ends, and then bent to the desired shape upon the mold C, substantially in the manner and for the purposes set forth.

CHRISTOPHER P. KELSEY.

Witnesses:
HENRY PARSLOW,
FRANCIS A. KELSEY.